United States Patent
Kim et al.

(10) Patent No.: US 10,533,560 B2
(45) Date of Patent: Jan. 14, 2020

(54) DIRECT DRIVE-TYPE TURBO BLOWER COOLING STRUCTURE

(71) Applicant: TURBOWIN CO., LTD., Cheongju-si, Chungcheongbuk-do (KR)

(72) Inventors: Minsoo Kim, Daejeon (KR); Youngkyu Park, Cheongju-si (KR)

(73) Assignee: TURBOWIN CO., LTD., Cheongju-si, Chungcheongbuk-do (KR)

( * ) Notice: Subject to any disclaimer, the term of this patent is extended or adjusted under 35 U.S.C. 154(b) by 223 days.

(21) Appl. No.: 15/576,497

(22) PCT Filed: Apr. 22, 2016

(86) PCT No.: PCT/KR2016/004208
§ 371 (c)(1),
(2) Date: Nov. 22, 2017

(87) PCT Pub. No.: WO2016/195238
PCT Pub. Date: Dec. 8, 2016

(65) Prior Publication Data
US 2018/0172028 A1 Jun. 21, 2018

(30) Foreign Application Priority Data
Jun. 5, 2015 (KR) .................. 10-2015-0079688

(51) Int. Cl.
*F04D 25/08* (2006.01)
*H02K 9/02* (2006.01)
(Continued)

(52) U.S. Cl.
CPC .......... *F04D 25/082* (2013.01); *F04D 17/16* (2013.01); *F04D 25/16* (2013.01); *F04D 29/584* (2013.01);
(Continued)

(58) Field of Classification Search
CPC .......... F04D 17/10; F04D 17/16; F04D 25/06; F04D 25/08–082; F04D 25/16;
(Continued)

(56) References Cited

U.S. PATENT DOCUMENTS 2,656,973 A * 10/1953 Sutherland ............ F04D 29/584
417/373
3,341,113 A * 9/1967 Sebok .................. F04D 17/164
417/368
(Continued)

FOREIGN PATENT DOCUMENTS

JP 2002-272061 A 9/2002
JP 2011-052551 A 3/2011
(Continued)

OTHER PUBLICATIONS

Japanese Office Action dated Dec. 4, 2018.

Primary Examiner — Alexander B Comley
(74) Attorney, Agent, or Firm — Rabin & Berdo, P.C.

(57) ABSTRACT

The present invention relates to a direct drive-type turbo blower cooling structure, and more particularly, to a direct drive-type turbo blower which includes a plurality of holes for cooling a stator along an outer diameter of a motor casing and a plurality of holes for cooling a coil part, a bearing housing, and a rotor to enhance cooling efficiency through the plurality of holes during operation of a cooling fan, thereby providing thermal balance.

1 Claim, 6 Drawing Sheets

(51) Int. Cl.
*F04D 17/16* (2006.01)
*F04D 29/58* (2006.01)
*F04D 25/16* (2006.01)
*F04D 29/28* (2006.01)
*F04D 29/056* (2006.01)
*F04D 29/42* (2006.01)
*F04D 29/44* (2006.01)

(52) U.S. Cl.
CPC ........... *F04D 29/5806* (2013.01); *H02K 9/02* (2013.01); *F04D 29/056* (2013.01); *F04D 29/281* (2013.01); *F04D 29/4226* (2013.01); *F04D 29/441* (2013.01)

(58) Field of Classification Search
CPC ............... F04D 25/166; F04D 29/4226; F04D 29/58–582; F04D 29/584; H02K 1/20; H02K 1/32; H02K 5/20; H02K 9/02
USPC ............... 417/366–371, 423.1, 423.7, 423.8, 417/423.11, 423.12, 423.14
See application file for complete search history.

(56) References Cited

U.S. PATENT DOCUMENTS

| | | | | |
|---|---|---|---|---|
| 3,932,070 A * | 1/1976 | Porter | ................... | F04D 25/082 417/423.2 |
| 4,518,325 A * | 5/1985 | Kingston | ............. | A61H 33/028 417/368 |
| 4,527,960 A * | 7/1985 | DeSisto | ................ | F04D 29/102 417/368 |
| RE32,027 E * | 11/1985 | Hyatt | ................... | F04D 25/082 15/413 |
| 5,350,281 A * | 9/1994 | Hagshenas | ............ | F04D 25/082 415/144 |
| 6,011,331 A * | 1/2000 | Gierer | ................... | H02K 29/06 310/52 |
| 6,102,672 A * | 8/2000 | Woollenweber | .... | F04D 29/5806 417/366 |
| 6,438,322 B1 * | 8/2002 | Reiker | ................... | F04D 25/088 392/364 |
| 6,631,243 B2 * | 10/2003 | Reiker | ................... | F04D 25/088 392/364 |
| 6,666,660 B2 * | 12/2003 | Kegg | ................... | F04D 29/281 15/326 |
| 7,922,466 B2 * | 4/2011 | Radermacher | ...... | F04D 29/4206 415/108 |
| 8,760,017 B2 * | 6/2014 | Henke | ................... | H02K 11/33 310/62 |
| 2002/0084702 A1 * | 7/2002 | Balas | ....................... | F02C 7/08 310/58 |
| 2003/0198563 A1 * | 10/2003 | Angle | ...................... | F04D 1/12 417/423.7 |
| 2006/0013712 A1 * | 1/2006 | Lee | ......................... | F04D 31/00 417/423.7 |
| 2007/0065317 A1 * | 3/2007 | Stock | ..................... | F04D 25/06 417/423.11 |
| 2011/0116953 A1 * | 5/2011 | Yi | ........................ | F04D 29/628 417/423.7 |
| 2011/0135519 A1 * | 6/2011 | Cho | ........................ | F04D 17/10 417/423.7 |
| 2012/0153620 A1 * | 6/2012 | Artinian | ................ | F04D 29/048 290/52 |
| 2013/0209218 A1 * | 8/2013 | Reunanen | ............... | F04D 13/06 415/1 |
| 2014/0292122 A1 * | 10/2014 | Pal | .......................... | H02K 5/20 310/59 |
| 2015/0063994 A1 | 3/2015 | Cho et al. | | |
| 2015/0247506 A1 * | 9/2015 | Lee | ........................ | F04D 17/105 417/366 |

FOREIGN PATENT DOCUMENTS

| | | |
|---|---|---|
| JP | 2013-031901 A | 2/2013 |
| KR | 10-2001-0064020 A | 7/2001 |
| KR | 10-0572849 B1 | 4/2006 |
| KR | 10-1072328 B1 | 10/2011 |
| KR | 10-2014-0017925 A | 2/2014 |
| KR | 10-1377057 B1 | 3/2014 |
| KR | 10-2015-0027629 A | 3/2015 |

\* cited by examiner

DIRECT DRIVE-TYPE TURBO BLOWER COOLING STRUCTURE

TECHNICAL FIELD

The present invention relates to a direct drive-type turbo blower cooling structure, and more particularly, to a direct drive-type turbo blower cooling structure which includes a plurality of holes for cooling a stator along an outer diameter of a motor casing and a plurality of holes for cooling a coil part, a bearing housing, and a rotor to enhance cooling efficiency through the plurality of holes during operation of a cooling fan, thereby providing thermal balance.

BACKGROUND ART

Generally, a blower is a mechanical device that generates energy of a fluid. The blower includes of an impeller that generates a flow, and a casing that guides a flow coming into and going out the impeller.

There are various kinds of methods of dividing the blower and they are divided into an axial blower, a radial blower, and a mixed blower according to the characteristics of the flow passing through the impeller.

For example, a radial type blower is mainly used for increasing a pressure due to a centrifugal force. Therefore, it is widely used where pressure is required rather than flow rate.

Also, in case of a centrifugal type blower, a helical casing is used in such a manner that an inlet flow of the impeller is in a direction of the rotation axis and the outlet flow thereof is in a direction perpendicular to the rotation axis or a tubular casing is used in such a manner that the inlet flow and the outlet flow of the impeller are in a direction of the rotation axis.

A turbo blower, which is a type of centrifugal blower, refers to a centrifugal blower having a relatively high pressure ratio. The impeller is rotated at a high speed in a vessel to radially flow the gas. In the centrifugal blowers using a centrifugal force, it refers to a turbo ventilator having a small pressure ratio and refers to the centrifugal type blower, that is, the turbo blower having a pressure ratio larger than the turbo ventilator.

The turbo blower includes a main body that forms an outer appearance, a driving unit that is provided inside the main body and substantially pressurizes the air, and a control unit that controls the driving of the driving unit. The air, which is introduced into the main body through the air inlet formed at the main body, is pressurized above a certain pressure to be discharged.

However, in the related art, the noise generated in the internal driving unit is largely transmitted to the outside. Also, since the internal structure for properly cooling the internal components of the driving unit is not provided, there are defects in that the lifespan of the internal components is reduced and the durability of the entire driving unit is reduced.

The cooling usually utilizes a method using an intake air or a gas flowing into the impeller. Or, a method of blowing a large amount of air therein through an air gap formed between a rotor and a stator or a cooling hole formed in the stator can be utilized.

In the former method, the power required for cooling is small, but it has a disadvantage that the sensitivity to the impeller is very high because the cooling system itself is closely interlocked with the impeller.

That is, since the structure of the cooling system is changed according to the design shape of the impeller, the degree of freedom of design is greatly restricted.

In addition, there is a problem in that the entire size of the turbo device is increased due to the characteristics of the cooling system.

The latter method has a disadvantage in that the cooling efficiency is very low because it has a structure of blowing a large amount of air therein by a considerable pressure by using a cooling fan.

Accordingly, a cooling system that relies on a cooling fan has a problem of consuming a relatively large amount of power in order to maintain an appropriate level of cooling. Since the introduced air cools the entire interior thereof, it is not enough to provide a regular cooling for each component. As a result, the cooling efficiency thereof is reduced.

Therefore, a direct drive-type turbo blower cooling structure for thermal balance is needed.

PATENT LITERATURE

Patent Literature 1: Korean Patent Registration No. 10-0572849 (Apr. 24, 2006)

DISCLOSURE

Technical Problem

The present invention has been made in an effort to solve the problems of the conceptual description of the conventional art as described above, and an object of the present invention is to provide a direct drive-type turbo blower cooling structure which includes a plurality of holes for cooling a stator along an outer diameter of a motor casing and a plurality of holes for cooling a coil part, a bearing housing, and a rotor to enhance cooling efficiency through the plurality of holes during operation of a cooling fan, thereby providing thermal balance.

That is, uniform cooling is achieved by maximizing a contact area of a stator, a coil part, a bearing, and a rotor constituted in a motor casing with air for cooling, thereby solving a problem in that only one component is cooled and thermal balance is broken.

Technical Solution

According to one aspect of the present invention so as to accomplish these objects, there is provided to a direct drive-type turbo blower cooling structure including:

a cylindrical motor casing (100);

a stator (200) embedded in the motor casing and including a rotor (250) therein;

a core ring (300) formed on one side of the stator and having a cooling air passage hole (310) through which air passes;

a left back plate (400) having a hole through which one side of the rotor passes;

a left cap (500) having one surface coupled with the left back plate and including a seal formed to prevent a generated fluid from being leaked by coupling the other side to a scroll volute;

a right back plate (600) formed between the motor casing and a cooling fan;

a bearing housing (700) disposed at both sides of the rotor and having a bearing for rotatably supporting the rotor;

an impeller (800) formed on one surface of the left cap;

a scroll volute (900) covering one side of the impeller, guiding flowing generated from the impeller, and converting kinetic energy of the fluid into position energy;

a scroll shroud (1000) coupled to one side of the scroll volute so as to surround the impeller and generating hydraulic pressure by making the air flow smoothly when the impeller rotates at a high speed;

a nozzle (1100) as a suction port through which the air flows coupled to one side of the scroll shroud and having a port part (1150) for measuring a flow rate which flows mounted on one side;

a cooling fan (1200) coupled to one side of the right back plate;

a fan scroll (1300) covering the cooling fan and discharging the fluid to the outside;

a fan cap (1400) coupled to one side of the fan scroll to prevent the air from leaking;

a diffuser (1500) positioned between the scroll volute and the impeller and having one side coupled to the scroll volute to smoothly reduce a flow speed of the fluid and increase static pressure; and a terminal block (130) formed at the end of the motor casing (100) to provide current to the stator, wherein the motor casing (100) includes a plurality of first holes (110) which is formed at an upper location of the stator along an outer diameter at a predetermined interval, and a plurality of second holes (120) spaced apart from the first holes by a predetermined distance and formed at the upper location of the coil part at a predetermined interval, when the cooling fan operates, first air (B) introduced by the first hole (110) cools heat of the stator through a first air passage (10) and the first air passing through the first air passage is provided to the coil part through the cooling air passage hole configured in the core ring, cools the heat of the coil part together with the second air (A) introduced by the second hole positioned at the left back plate (400) side from the first hole, and cools the bearing housing formed on a lower side through a second air passage (20), and the first and second air are supplied again to a third air passage 30 formed between the rotor and the stator to cool the rotor and the stator, and cools the bearing housing and the coil part together with the second air (C) introduced by the second hole positioned at the right back plate (600) side from the first hole, and the second air (C) is mixed with the air that cools the rotor and the stator after cooling the coil part and provided to a fifth air passage (50) through a fourth air passage (40) to discharge the air (D) that is internally circulated to the outside through the fan scroll.

Advantageous Effects

According to the direct drive-type turbo blower cooling structure of the present invention having the above component and action, there is an effect in that it includes a plurality of holes for cooling a stator along an outer diameter of a motor casing and a plurality of holes for cooling a coil part, a bearing housing, and a rotor to enhance cooling efficiency through the plurality of holes during operation of a cooling fan, thereby providing thermal balance.

That is, the uniform cooling is achieved by maximizing a contact area of a stator, a coil part, a bearing, and a rotor constituted in a motor casing with air for cooling, thereby solving a problem in that only one component is cooled and thermal balance is broken.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

Figure 1:
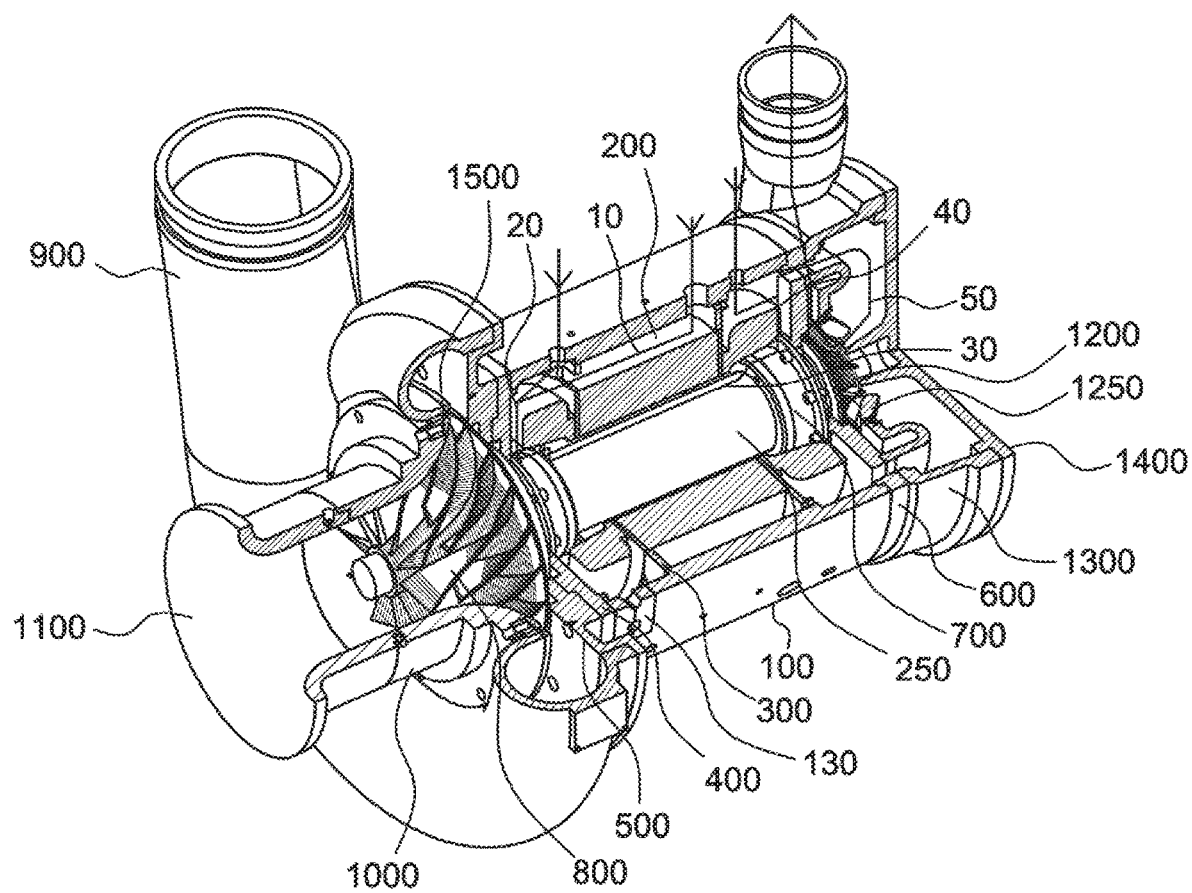
FIG. 1 is a cut-out perspective view of a direct drive-type turbo blower cooling structure according to an embodiment of the present invention.

100: motor casing
200: stator
250: rotor
300: core ring
400: left back plate
500: left cap
600: right back plate
700: bearing housing
800: impeller
900: scroll volute
1000: scroll shroud
1100: nozzle
1200: cooling fan
1300: fan scroll
1400: fan cap

BEST MODE

Mode for Invention

Hereinafter, an embodiment of a direct drive-type turbo blower cooling structure according to the present invention will be described in detail.

A turbo blower cooling structure in the related art is a system that blows air, thus it is impossible to achieve thermal balance of internal components.

However, the present invention is a system that sucks the air, and it is possible to simultaneously cool the internal components, thereby achieving the thermal balance.

FIG. 1 is a cut-out perspective view of a direct drive-type turbo blower cooling structure according to an embodiment of the present invention.

Figure 2:
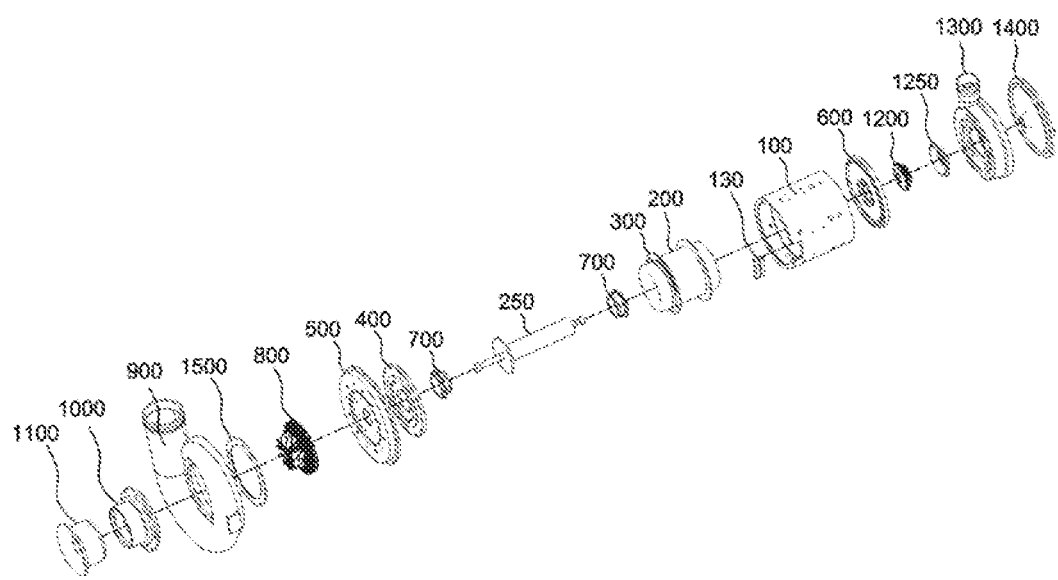
FIG. 2 is an exploded perspective view of the direct drive-type turbo blower cooling structure according to the embodiment of the present invention.

FIG. 2 is an exploded perspective view of the direct drive-type turbo blower cooling structure according to the embodiment of the present invention.

Figure 3:
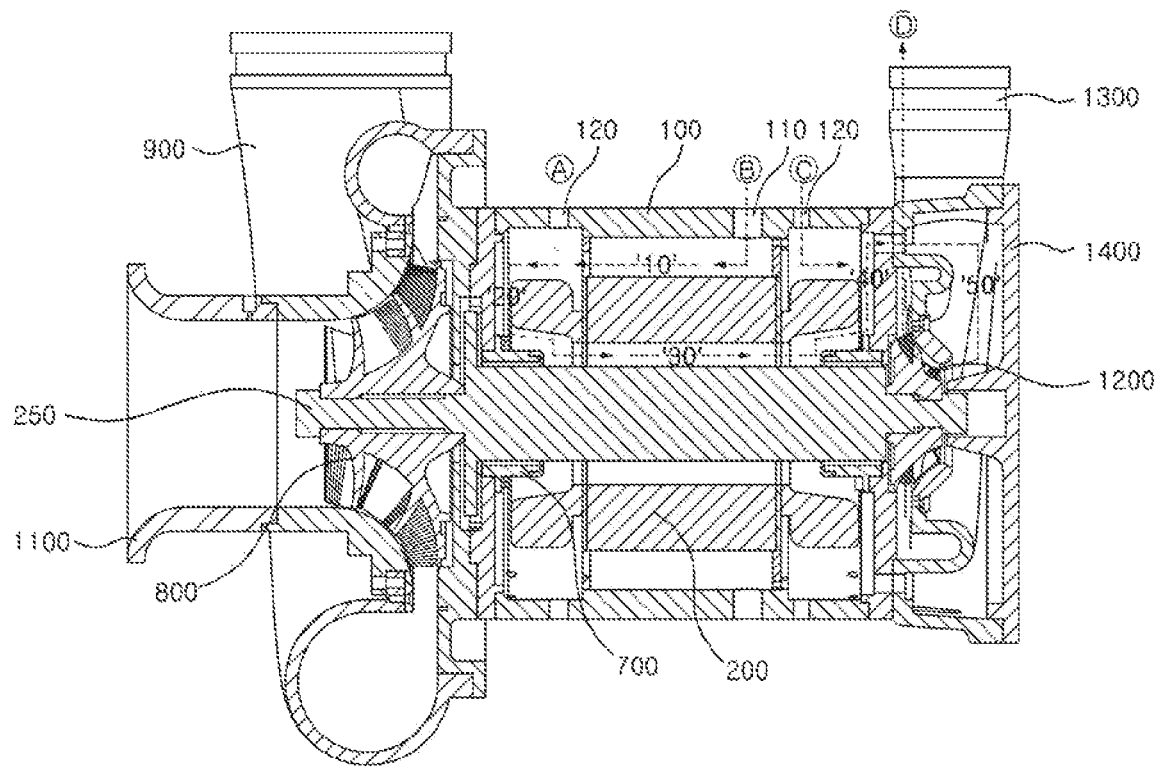
FIG. 3 is a cross-sectional view of the direct drive-type turbo blower cooling structure according to the embodiment of the present invention.
Figure 4:
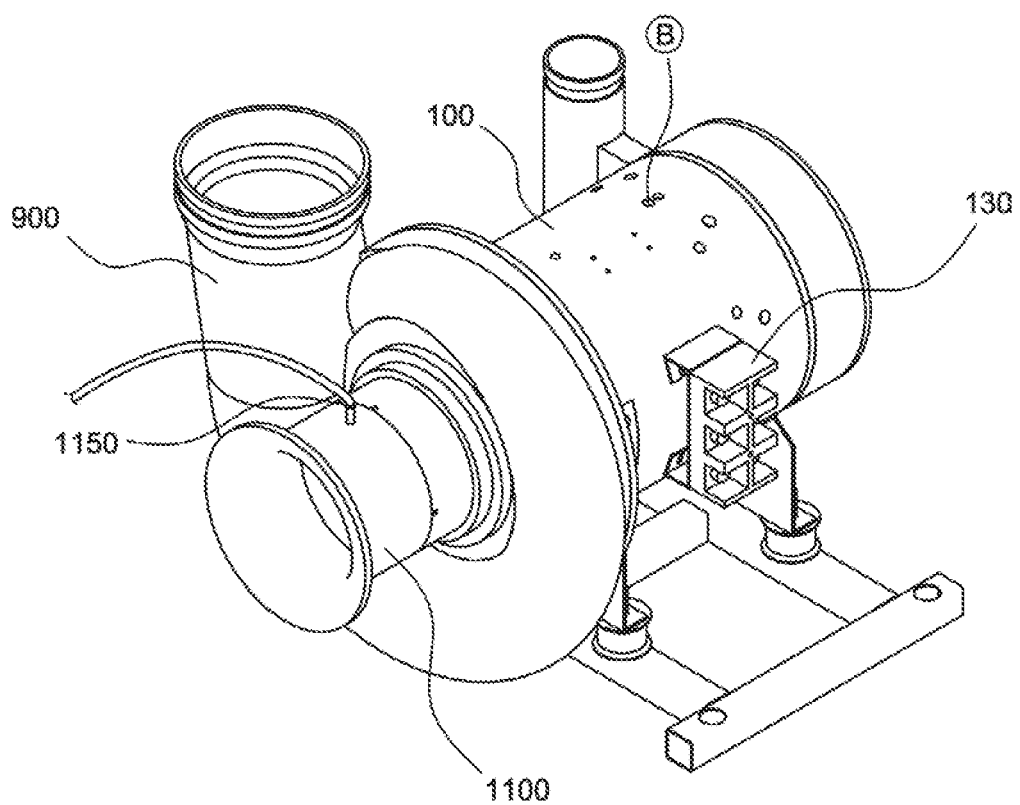
FIGS. 4 to 7 are photographs of the direct drive-type turbo blower cooling structure according to the embodiment of the present invention.
Figure 5:
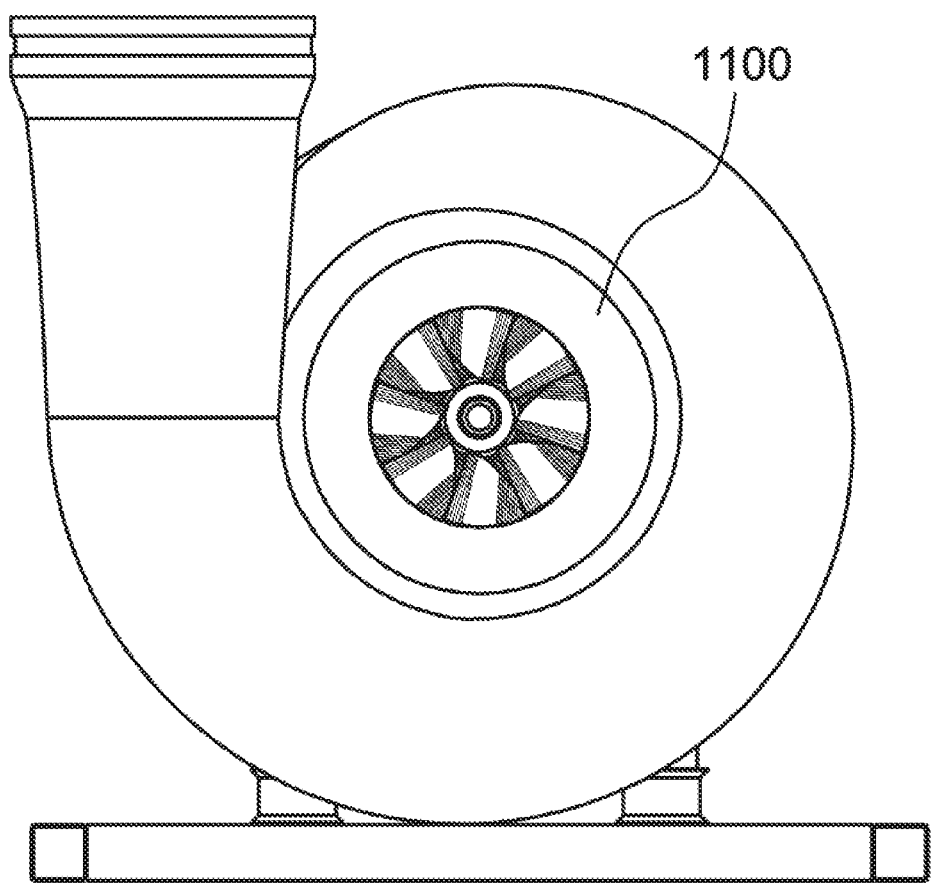

FIG. 3 is a cross-sectional view of the direct drive-type turbo blower cooling structure according to the embodiment of the present invention.

FIGS. 4 to 7 are photographs of the direct drive-type turbo blower cooling structure according to the embodiment of the present invention.

As illustrated in FIGS. 1 to 3, the direct drive-type turbo blower cooling structure of the present invention is configured to include: a motor casing (100); a stator (200); a core ring (300); a left back plate (400); a left cap (500); a right back plate (600); a bearing housing (700); an impeller (800); a scroll volute (900); a scroll shroud (1000); a nozzle (1100); a cooling fan (1200); a fan scroll (1300); and a fan cap (1400).

The motor casing (100) is formed in a cylindrical shape and the stator (200) including a rotor (250) is configured in the motor casing.

The rotor is referred to as a rotor that rotates around a rotation axis and the stator is a stator that rotates the rotor by generating magnetic force due to current which flows by a coil part wound on the stator.

Figure 6:
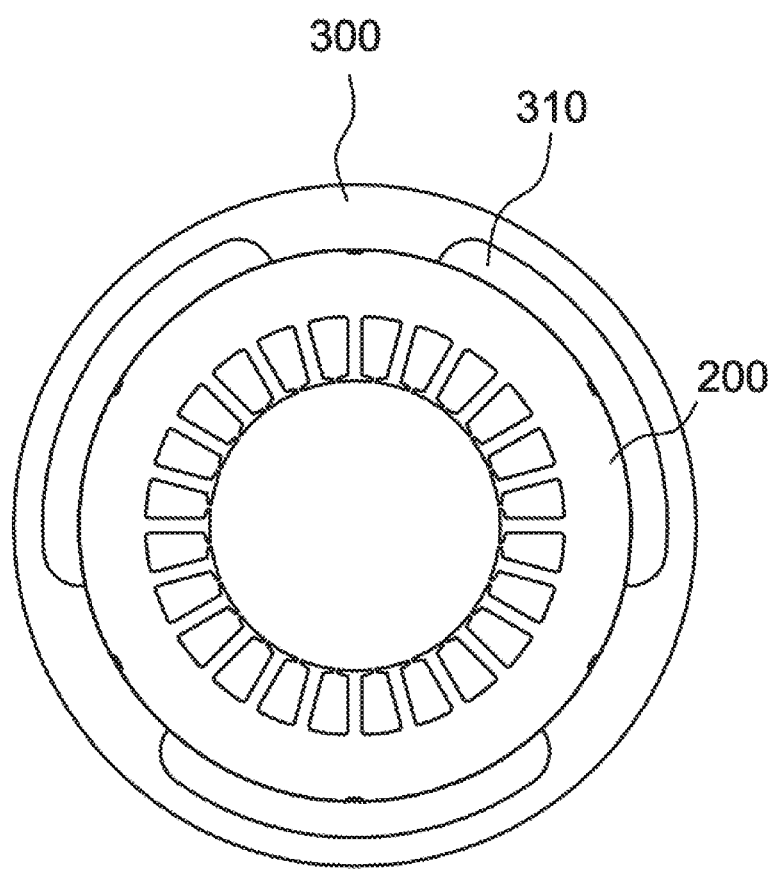
Figure 7:
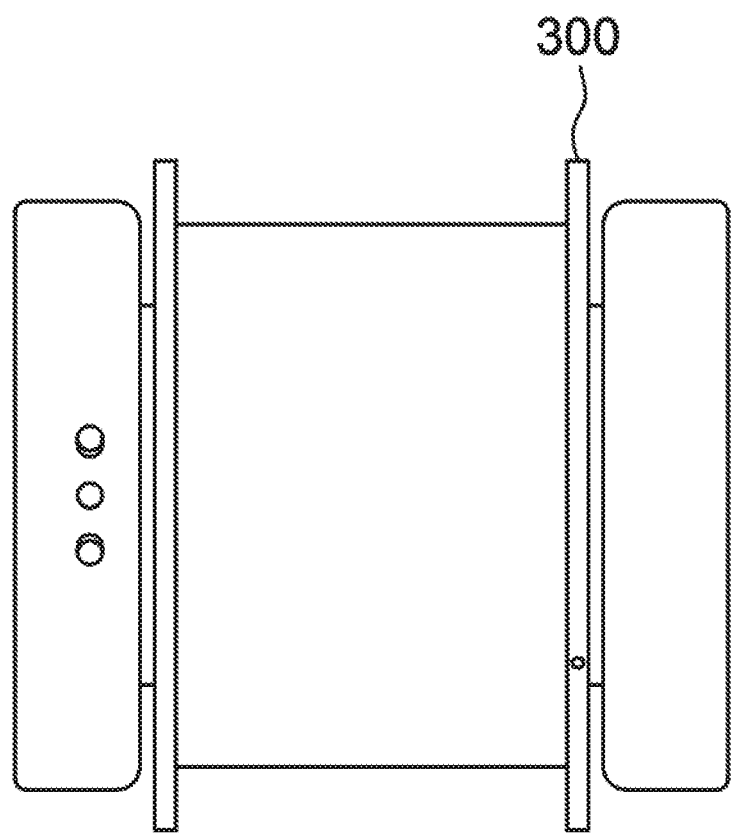

In this case, the core ring (300) is formed on one side of the stator, and as illustrated in FIG. 6, the core ring (300) has a plurality of cooling air passage holes (310) through which air passes.

As illustrated in the figure, the left back plate (400) has a hole at a central portion thereof for passing one side of the rotor, and the left cap (500) is coupled to one surface of the left back plate.

In this case, the left cap (500) includes a seal.

In this case, the other side of the left cap acts as a blocking plate for preventing a fluid generated by coupling to the scroll volute from being leaked.

Further, the right back plate (600) is formed between the motor casing and the cooling fan.

Of course, it is natural that a center hole is formed at the center portion so that the rotor penetrates the central portion.

The bearing housing (700) includes a bearing for rotatably supporting the rotor on one surface of the right back plate, which is configured on one side of a disk formed on one side of the rotor.

In addition, the impeller (800) is formed on one surface of the left cap, the scroll volute (900) surrounds one side of the impeller, and is configured to guide flowing generated from the impeller to convert kinetic energy of the fluid into position energy.

It is characterized in that the fluid generated by the impeller is not provided in the direction of the motor casing.

Further, the scroll shroud (1000) is coupled to one side of the scroll volute so as to surround the impeller, and as a result, when the impeller rotates at a high speed, the air smoothly flows to generate hydraulic pressure.

In addition, the nozzle (1100) is a suction port through which the air flows, and is formed to be coupled to one side of the scroll shroud.

Meanwhile, the cooling fan (1200) is coupled to one side of the right back plate, and the fan scroll (1300) is configured to surround the cooling fan to discharge the fluid to the outside.

The fan cap (1400) for preventing the air from leaking is configured on one side of the fan scroll.

In this case, a fan lid (1250) is configured between the cooling fan and the fan scroll and the fan lid (1250) as a housing covering the cooling fan helps cooling air flow.

Meanwhile, according to an additional aspect, a diffuser (1500) may be formed between the scroll volute and the impeller and one side of the diffuser (1500) is coupled to the scroll volute to serve to smoothly reduce a flow rate of the fluid and increase static pressure.

In addition, in order to achieve an object to be pursued in the present invention, the motor casing (100) is configured to include a plurality of first holes (110) formed at an upper location of the stator along an outer diameter at a predetermined interval, and a plurality of second holes (120) spaced apart from the first holes by a predetermined distance and formed at the upper location of the coil part at a predetermined interval.

As for the air flow, when the cooling fan operates, the stator is cooled through first air (B) introduced by the first hole, and the coil part, the bearing housing, and the rotor are cooled through second air (A or C) introduced by the first air and the second hole, and thereafter, air (D) which is internally circulated is discharged to the outside through the fan scroll.

By providing the air flow as described above, main components of the turbo blower are uniformly cooled to provide thermal balance.

As for an operation, when the rotor rotates due to current flow, the impeller and the cooling fan mounted on both ends of the rotor rotate together.

By the rotation of the cooling fan, the air sucked by the first hole and the second hole cools the internal components of the motor casing and thereafter, is discharged to the outside.

First, the first air (B) introduced by the first hole cools heat of the stator through a first air passage (10), the first air passing through the first air passage is provided to the coil part through the cooling air passage hole configured in the core ring, cools the heat of the coil part together with the second air (A) introduced by the second hole, and cools the bearing housing formed on a lower side through a second air passage (20), and the first and second air are supplied again to a third air passage (30) formed between the rotor and the stator to cool the rotor and the stator and cool another bearing housing and another coil part together with the second air (C) introduced by another second hole.

The second air (C) is mixed with the air that cools the rotor and the stator after cooling another coil part and provided to a fifth air passage (50) through a fourth air passage (40) to finally discharge the air (D) that is internally circulated to the outside through the fan scroll.

According to the cooling structure of the present invention for cooling the turbo blower through such a path of the air flow passage as described above, since an outer surface and an inner surface of the stator, the outer surface, a lateral surface, and the inner surface of the coil part, the outer surface of the rotor, the outer surface of the bearing housing, the left back plate, the right back plate, and the like are uniformly cooled, the generated heat is uniformly cooled when the turbo blower is driven, thereby achieving the thermal balance.

Meanwhile, a terminal block (130) is formed at the end of the motor casing (100) to provide the current to the stator, thereby rotating the rotor.

Further, since a port part (1150) is mounted on one side of the nozzle, the flow rate may be conveniently measured.

By such a configuration, uniform cooling is achieved by maximizing a contact area of the stator, the coil part, the bearing housing, and the rotor constituted in the motor casing with the air for cooling to solve a problem in that only one component is cooled and the thermal balance is thus broken, thereby providing the thermal balance in the motor casing.

Those skilled in the art will be able to understand that the present invention can be easily executed in other detailed forms without changing the technical spirit or an essential feature thereof. Therefore, it should be appreciated that the aforementioned embodiments are illustrative in all aspects and are not restricted.

The scope of the present disclosure is represented by claims to be described below rather than the detailed description, and it is to be interpreted that the meaning and scope of the claims and all the changes or modified forms derived from the equivalents thereof come within the scope of the present invention.

INDUSTRIAL APPLICABILITY

Since the present invention has an effect of providing the thermal balance by enhancing cooling efficiency through the plurality of holes when the cooling fan operates, the present invention will be able to be usefully used in the field of turbo blower cooling technology.

What is claimed is:

1. A direct drive-type turbo blower cooling structure comprising: a cylindrical motor casing; a stator embedded in the motor casing, the stator including a first coil part at one end and a second coil part at an opposite end from the one end; a rotor housed in the stator; a core ring formed on one side of the stator and having a cooling air passage hole through which air passes; a left back plate having a hole through which one end of the rotor passes; a left cap having one surface on one side of the left cap, the one surface coupled with the left back plate, the left cap including a seal to prevent a fluid from being leaked by coupling the other side of the left cap to a scroll volute; a right back plate formed between the motor casing and a cooling fan; a bearing housing including a first bearing housing at the one end of the rotor and a second bearing housing at an opposite end of the rotor from the one end, each of the first and second bearing housings having a bearing for rotatably supporting the rotor; an impeller mounted on another surface of the left cap, the another surface being on the other side of the left cap; the scroll volute covering one side of the impeller and guiding a fluid flow of the fluid, the fluid flow generated by rotation of the impeller; a scroll shroud coupled to one side of the scroll volute so as to surround the impeller, the scroll shroud shaped to generate fluid pressure in the fluid flow when the impeller rotates; a nozzle coupled to one side of the scroll shroud to be a suction port through which the fluid flows into the impeller, the nozzle having a port part on one side for measuring a flow rate; the cooling fan coupled to one side of the right back plate; a fan scroll covering the cooling fan; a fan cap coupled to one side of the fan scroll to prevent the air from leaking; a diffuser positioned between the scroll volute and the impeller and having one side coupled to the scroll volute to smoothly reduce a flow speed of a portion of the fluid in contact with the diffuser and to increase static pressure of the portion of the fluid in contact with the diffuser; and a terminal block formed at an end of the motor casing to provide current to the stator, wherein the motor casing includes a plurality of first holes along an outer diameter of the motor casing at a predetermined interval and facing the stator, and a plurality of second holes spaced apart from the first holes by a predetermined distance, the plurality of second holes formed along the outer diameter of the motor casing at a predetermined interval and facing the first coil part and the second coil part, respectively, wherein when the cooling fan operates, first air introduced by the plurality of first holes passes through a first air passage between the stator and the motor casing to cool the stator, the first air passing through the first air passage passes through the cooling air passage hole of the core ring to pass over the first coil part, the first air combines with second air introduced by at least one first hole of the plurality of second holes to flow through a second air passage between the first coil part and the left back plate, the at least one first hole of the plurality of second holes located closer to the left back plate than the plurality of first holes, the combined first and second air flows over the first bearing housing to cool the first bearing housing, the combined first and second air flows through a third air passage formed between the rotor and the stator to cool the rotor, the stator, and the second bearing housing, the combined first and second air flow through a fourth air passage between the second coil part and the right back plate to cool the second bearing housing and the second coil part, third air, introduced by at least one second hole of the plurality of second holes flows between the second coil part and the motor casing to cool the second coil part, the at least one second hole of the plurality of second holes located closer to the right back plate than the plurality of first holes, the combined first and second air combine with the third air to flow through a fifth air passage defined by the fan scroll and the fan cap to discharge the combined first, second, and third air to outside the direct drive-type turbo blower cooling structure.

* * * * *